(12) United States Patent
Srivastava (10) Patent No.: US 8,885,931 B2
(45) Date of Patent: Nov. 11, 2014

(54) MITIGATING USE OF MACHINE SOLVABLE HIPS

(75) Inventor: Kumar S. Srivastava, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 335 days.

(21) Appl. No.: 13/013,968

(22) Filed: Jan. 26, 2011

(65) Prior Publication Data

US 2012/0189194 A1    Jul. 26, 2012

(51) Int. Cl.
    *G06K 9/62*      (2006.01)
    *G06F 21/36*     (2013.01)
    *G06F 21/31*     (2013.01)

(52) U.S. Cl.
    CPC .............. *G06K 9/6255* (2013.01); *G06F 21/36* (2013.01); *G06F 21/316* (2013.01)
    USPC ........... 382/161; 382/155; 382/156; 382/157; 382/159; 726/26; 726/27; 726/28; 726/29

(58) Field of Classification Search
    USPC .................................. 382/161, 100; 726/21, 7
    See application file for complete search history.

(56) References Cited

U.S. PATENT DOCUMENTS

| 4,697,178 | A  | * | 9/1987  | Heckel .......................... 345/422 |
| 6,195,698 | B1 | * | 2/2001  | Lillibridge et al. ............ 709/225 |
| 7,533,411 | B2 | * | 5/2009  | Goodman et al. .............. 726/21 |
| 7,624,277 | B1 | * | 11/2009 | Simard et al. ................. 713/182 |
| 7,653,944 | B2 | * | 1/2010  | Chellapilla et al. ............. 726/27 |
| 7,665,131 | B2 | * | 2/2010  | Goodman et al. ............... 726/13 |
| 7,725,395 | B2 | * | 5/2010  | Rui et al. ......................... 705/50 |
| 7,870,609 | B2 | * | 1/2011  | Hulten et al. .................... 726/22 |
| 7,891,005 | B1 | * | 2/2011  | Baluja et al. .................... 726/26 |
| 7,929,805 | B2 | * | 4/2011  | Wang et al. .................... 382/298 |
| 7,945,950 | B2 | * | 5/2011  | Nanda et al. .................... 726/10 |
| 8,019,127 | B2 | * | 9/2011  | Misra ............................. 382/115 |
| 8,175,394 | B2 | * | 5/2012  | Vincent et al. ................ 382/225 |
| 8,209,741 | B2 | * | 6/2012  | Elson et al. ...................... 726/2 |
| 8,214,892 | B2 | * | 7/2012  | Cohen et al. ..................... 726/19 |
| 8,296,659 | B1 | * | 10/2012 | Antypas, III .................. 715/741 |
| 8,332,937 | B1 | * | 12/2012 | Eger ............................... 726/21 |
| 8,353,017 | B2 | * | 1/2013  | Cerruti et al. ..................... 726/5 |
| 8,391,771 | B2 | * | 3/2013  | Goodman et al. ............. 434/350 |
| 8,392,986 | B1 | * | 3/2013  | Gossweiler, III ............... 726/19 |

(Continued)

OTHER PUBLICATIONS

Using Machine Learning to break Visual HIPs, Kumar Chellapilla 2004.*

(Continued)

*Primary Examiner* — Chan Park
*Assistant Examiner* — Iman K Kholdebarin
(74) *Attorney, Agent, or Firm* — Bryan Webster; Andrew Sanders; Micky Minhas (57) ABSTRACT

One or more techniques and/or systems are disclosed for mitigating machine solvable human interactive proofs (HIPs). A classifier is trained over a set of one or more training HIPs that have known characteristics for OCR solvability and HIP solving pattern from actual use. A HIP classification is determined for a HIP (such as from a HIP library used by a HIP generator) using the trained classifier. If the HIP is classified by the trained classifier as a merely human solvable classification, such that it may not be solved by a machine, the HIP can be identified for use in the HIP generation system. Otherwise, the HIP can be altered to (attempt to) be merely human solvable.

20 Claims, 7 Drawing Sheets

(56) References Cited

U.S. PATENT DOCUMENTS

| | | | | |
|---|---|---|---|---|
| 8,433,916 B2 * | 4/2013 | Kohavi | | 713/182 |
| 8,555,353 B2 * | 10/2013 | Von Ahn et al. | | 726/5 |
| 2003/0204569 A1 * | 10/2003 | Andrews et al. | | 709/206 |
| 2004/0254793 A1 | 12/2004 | Herley et al. | | |
| 2005/0065802 A1 * | 3/2005 | Rui et al. | | 705/1 |
| 2005/0066201 A1 * | 3/2005 | Goodman et al. | | 713/202 |
| 2005/0246775 A1 | 11/2005 | Chellapilla et al. | | |
| 2007/0101010 A1 * | 5/2007 | Ellison et al. | | 709/229 |
| 2007/0234423 A1 * | 10/2007 | Goodman et al. | | 726/21 |
| 2008/0063276 A1 * | 3/2008 | Vincent et al. | | 382/182 |
| 2008/0127302 A1 * | 5/2008 | Qvarfordt et al. | | 726/2 |
| 2008/0147456 A1 * | 6/2008 | Broder et al. | | 705/7 |
| 2009/0006575 A1 * | 1/2009 | Hulten et al. | | 709/207 |
| 2009/0076965 A1 * | 3/2009 | Elson et al. | | 705/55 |
| 2009/0083826 A1 * | 3/2009 | Baribault | | 726/1 |
| 2009/0113294 A1 * | 4/2009 | Sanghavi et al. | | 715/269 |
| 2009/0116736 A1 * | 5/2009 | Neogi et al. | | 382/159 |
| 2009/0150983 A1 * | 6/2009 | Saxena et al. | | 726/7 |
| 2010/0031330 A1 * | 2/2010 | Von Ahn et al. | | 726/5 |
| 2010/0037319 A1 * | 2/2010 | Steeves et al. | | 726/23 |
| 2010/0082998 A1 * | 4/2010 | Kohavi | | 713/182 |
| 2010/0095350 A1 * | 4/2010 | Lazar et al. | | 726/3 |
| 2010/0153275 A1 * | 6/2010 | Jakobsson et al. | | 705/71 |
| 2010/0162357 A1 * | 6/2010 | Chickering et al. | | 726/3 |
| 2011/0072498 A1 * | 3/2011 | Li et al. | | 726/6 |
| 2011/0113147 A1 * | 5/2011 | Poluri et al. | | 709/229 |
| 2011/0209076 A1 * | 8/2011 | Saxena et al. | | 715/764 |
| 2011/0314537 A1 * | 12/2011 | Hulten et al. | | 726/17 |
| 2011/0314540 A1 * | 12/2011 | Poluri et al. | | 726/21 |
| 2012/0154434 A1 * | 6/2012 | Costea | | 345/629 |
| 2012/0189194 A1 * | 7/2012 | Srivastava | | 382/161 |
| 2012/0222101 A1 * | 8/2012 | Iwasaki et al. | | 726/7 |
| 2012/0254964 A1 * | 10/2012 | Kumar et al. | | 726/7 |

OTHER PUBLICATIONS

An algorithm to analyze strength of CAPTCHA, Parbhane, India.*
Breaking a Visual Captcha, Mori et al. 2003.*
Computers beat Humans at Single Character Recognition in Reading Based HIP, Chellapilla 2005.*
Chew; et al., "Baffle Text: a Human Interactive Proof"—Published Date: 2003 http://www.cse.lehigh.edu/~baird/Pubs/baffletext.pdf.

* cited by examiner

MITIGATING USE OF MACHINE SOLVABLE HIPS

BACKGROUND

Network based (e.g., Internet) access to documents, data, interactive content, uploading and/or downloading of content, for example, is typically controlled by an administrator of a network location providing the access. For example, an online user may wish to post content, such as a comment, to a blog or news site. In this example, the administrator of the site may want to limit postings to merely human users (e.g., and not automated bot posters), and can require the user to register or log-in. Often, as part of the log-in or registration process a human interactive proof (HIP) may be used in an attempt to identify the user as a human (e.g., some sort of interaction that merely humans may be able to perform, and not automated software). For example, a Completely Automated Public Turing test to tell Computers and Humans Apart (CAPTCHA) image can be displayed during registration, and the user can be asked to input the characters found in the image.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Human interactive proofs (HIPs) are often used to mitigate use of automated software (e.g., bots) from performing actions on a website that may degrade a quality of service for the website, such as by abusing the site and/or using resources (e.g., by clogging bandwidth). Typically, HIPs are used to help protect systems vulnerable to e-mail spam, such as the webmail services; to mitigate posting spam on message boards, blogs, or news sites, such as for vandalism or to drive traffic to a site; and/or to mitigate malicious use of resources on a site.

However, HIPs have been considered broken for some time, as they can often fail in their goal to block machines or bots from performing certain actions while allowing humans to perform certain actions. For example, character recognition (e.g., optical character recognition (OCR)) algorithms are often used by bots to solve HIPs. Alternately, some malicious users utilize HIP farms, comprising a plurality of humans, to solve HIPs at a very small price per solved HIP. Typically, those HIPs that are not machine solvable are sent to the HIP farms for solving. Moreover, as machine solving technology for HIPs improves, fewer Hips may have to be sent to HIP farms such that a malicious user/entity can solve HIPs at an ever decreasing cost. However, if the number of HIPs that have to be sent to a HIP farm (e.g., necessitate a human to solve) can be increased, the cost to the malicious user may increase, thereby mitigating the attempt by malicious users to solve HIPs.

Accordingly, one or more techniques and/or systems are disclosed for reducing a number of machine solvable HIPs used by a HIP generation system (e.g., providing HIPs for a website). HIP challenges that may be solved by BOTs/Machines can be detected through various heuristics and these HIPs can be removed from use by the HIP system. Machine solvable HIP challenges may have common characteristics, and a trained classifier may use these characteristics to identify machine solvable HIPs, such as in a HIP store. A feedback loop, involving feedback from users, HIP system logs and/or machine learning system, for example, can be applied to further improve machine solvable HIP detection. The machine solvable HIP challenges can be removed from circulation in a HIP system, and non machine solvable HIPs can be promoted to increase their circulation in the HIP system.

In one embodiment for mitigating machine solvable human interactive proofs (HIPs), a HIP classification is determined for a HIP using a trained classifier. In this embodiment, the classifier is trained over a set of one or more training HIPs that have known characteristics, such as HIP optical character recognition (OCR) solvability (e.g., can the HIP be solved by OCR), and a HIP solving pattern (e.g., how the HIP is solved in use). Further, the HIP can be identified for use in a HIP generation system if the HIP is classified by the trained classifier as a merely human solvable classification (e.g., and not machine solvable).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
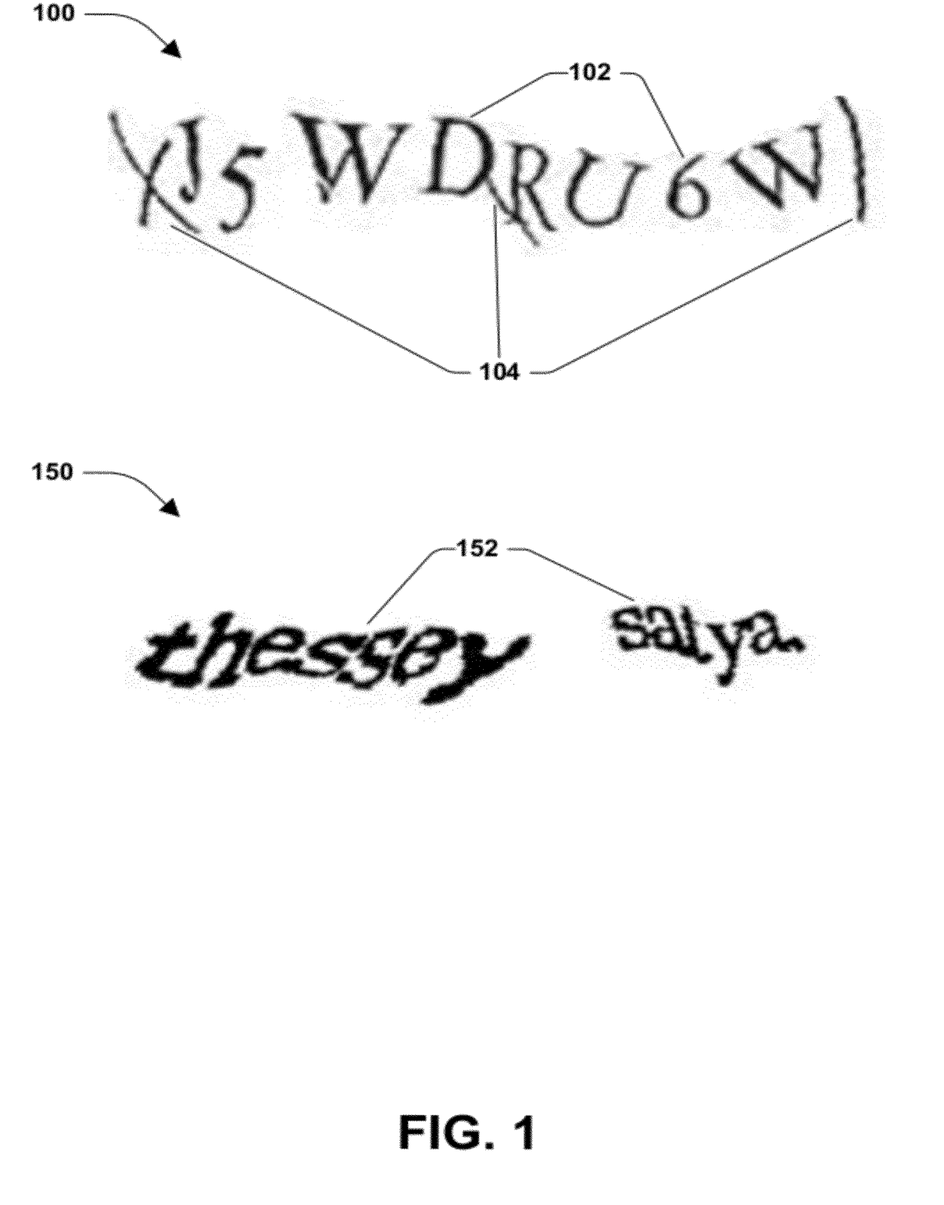
FIG. 1 illustrates example embodiments of human interactive proofs (HIPs)

FIG. 1 illustrates example embodiments 100, 150 of human interactive proofs (HIPs), also known as CAPTCHAs ("Completely Automated Public Turing test to tell Computers and Humans Apart"). HIPS are designed to mitigate automated log-in or authentication by machines, such as by a program using an optical character recognition (OCR) algorithm to identify characters found in a HIP. For example, in the example embodiment 100, the HIP comprises alphanumeric characters 102 that are altered from their typical appearance, such as by changing a rotation, alignment, and/or shape of the character. Further, in this example 100, the HIP can comprise non-alphanumeric inclusions 104 that may also confuse an OCR algorithm.

For example, OCR algorithms are typically designed to recognize alphanumeric characters as they may normally appear when written or typed in a document. The algorithms can scan the characters and attempt to match them individually, for example, to one or more characters in a library associated with the OCR algorithm (e.g., a library of English letters). While the OCR algorithms may have difficulty in recognizing the characters comprised in the HIP, humans can typically (e.g., although not always) recognize the characters, and reproduce them when asked to enter the HIP in a log-in procedure, for example.

In the example embodiment 150, the HIP comprise two "words" 152 that need to be entered in order to authenticate or log-in, for example. Further, in this example, the shape and size of the characters is altered, along with the alignment and rotation. Additionally, some of the characters are joined, without a space between. These are examples of techniques used to mitigate automated reading of the HIPs, while allowing humans to recognize the respective characters for the "words" 152. However, even though a many HIP designs can mitigate automated reading of the HIPs, some HIPs may still be broken or solved by machines, particularly as OCR algorithms improve in recognition ability.

A method may be devised that provides for limiting the effectiveness of automated HIP recognition systems. A HIP generation system, such as used by a user log-in protocol, may store and provide a plurality of HIPs, comprising various techniques for mitigating automated detection, for example. Some HIPs used by such a system may not be solvable by machines, while others may be broken by the automated detection systems. Those HIPs that can be broken or recognized by automated systems can be removed from use, such as be removing them from a HIP selection library; or they may be changed such that an automated detection system may not recognize the HIP, for example.

Figure 2:
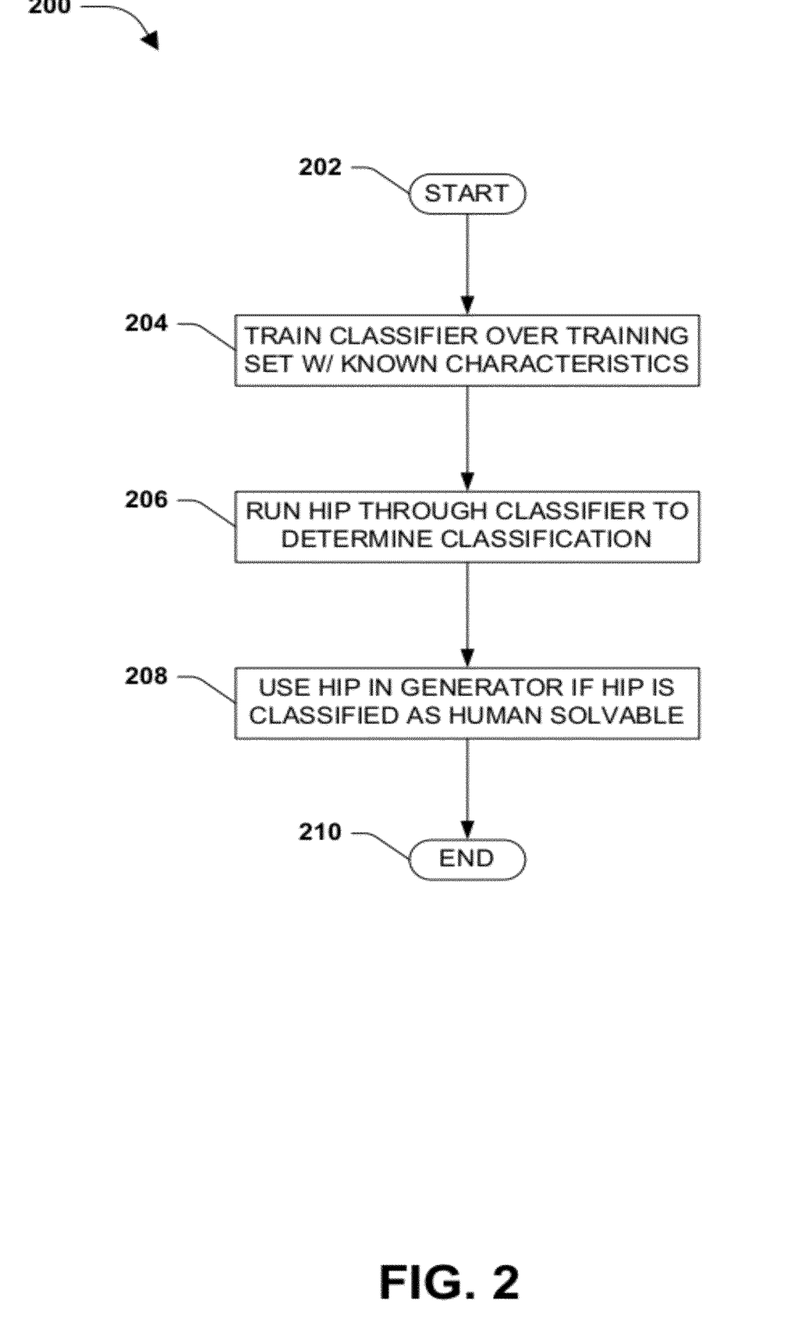
FIG. 2 is a flow diagram of an exemplary method for mitigating machine solvable human interactive proofs (HIPs)

FIG. 2 is a flow diagram of an exemplary method 200 for mitigating machine solvable human interactive proofs (HIPs). The exemplary method 200 begins at 202 and involves training a HIP classifier over a training set of HIPs that have known characteristics, at 204. The known characteristics of the HIPs used in the training set comprise a HIP optical character recognition (OCR) solvability characteristic, and a HIP solving pattern characteristic. For example, a classifier can comprise a machine learning algorithm that learns to solve for a classification (e.g., solution) of an item based on input characteristics (e.g., input variables). In the training set, for example, respective items comprise known characteristics (e.g., variables having a known value), and a desired classification is also known (e.g., a correct solution for the item is known).

In one embodiment, variables for the training set can comprise the HIP OCR solvability, and the HIP solving pattern. A HIP OCR solvability characteristic may comprise a value, for example, that indicates how readily the HIP can be solved by an OCR system (algorithm). In one embodiment, a higher score may indicate a likelihood of solvability, such as a probability of solvability (e.g., 100=100% solvable by OCR, 0=0% solvable by OCR). Further, in one embodiment, a plurality of OCR systems may be used to determine the HIP OCR solvability, for example, and a combination of scores from the respective OCR systems can be used to determine the HIP OCR solvability (e.g., median, mean, mode, or some other statistical value of combined probability scores).

A HIP solving pattern can comprise a value assigned for one or more HIP solving characteristics, for example. When solving a HIP humans and machines provide characteristic solving patterns that may be more particular to one group. For example, machine solvers typically provide a solution far more quickly than human solvers of HIPs, and humans typically take longer to enter respective characters of the HIP. Further, mistakes made by humans when solving HIPs are typically different than those made by machines. Additionally, humans can sometime change characters when solving, whereas machines typically do not change characters. In one embodiment, these solving characteristics can be identified and a value may be assigned to the characteristic.

Further, in this embodiment, the known solution can comprise a value, such as a probability, for example, that indicates a classification of "machine solvable" or "human solvable." In one embodiment, the classifier can be trained over a set of one or more training HIPs using the known characteristics, where the HIPs have been solved by humans, and where the HIPs have been solved by machines. In this way, for example, the solution is known as solved by a human or solved by a machine. Further, in one embodiment, the classifier can be trained, for example, until it can appropriately solve the respective training set items (e.g., as human and/or machine solvable). Additionally, in one embodiment, the classifier can be further trained (e.g., refined) using non-training set items, such as from subsequent classification of HIPs.

At 206, a HIP can be run through the trained classifier to determine a HIP classification for the HIP. For example, a HIP generation system used by a log-in protocol (e.g., for a webpage that registers new users) may utilize a library of pre-generated HIPs for a registration procedure. As another example, a HIP generation system may create new HIPs that can be added to an existing library and/or used by a registration system upon creation. In these examples, respective HIPs in the HIP library, or newly generated HIPs, can be run through the trained classifier to determine the HIP classification.

As described above, a HIP that can be solved by a machine (e.g., an OCR program running on a computer) may not be desirable for use in a user registration system, for example. Therefore, in one embodiment, those HIPs that can be solved by machines can be eliminated from use, for example, by removing them from the HIP library or not adding them to the HIP library if newly created. In one embodiment, the trained classifier may identify those HIPs that are merely human solvable (e.g., are not solved by machines).

At 208 in the exemplary method 200, the HIP is identified as one that can be used in a HIP generator if the HIP is classified as merely human solvable by the trained classifier. For example, if the HIP is newly created and has not been used in the user registration process, and it is classified as merely human solvable, it may be added to the HIP generator library (e.g., or used by the generator). However, in this example, if the HIP is not classified as merely human solvable (e.g., at least a part of the HIP can be solved by a machine), the HIP may be rejected for use in the HIP generator library. In this way, for example, the HIP generator may utilize merely those HIPs that are classified as human solvable, and not machine solvable. Reducing machine solvable HIPs from a user registration process can also mitigate a potential for malicious intent, for example, as automated HIP solving is typically used for malicious purposes (or at least undesirable purposes with respect to a website owner).

Having identified the HIP as one that can be used by the HIP generator, the exemplary method 200 ends at 210.

Figure 3:
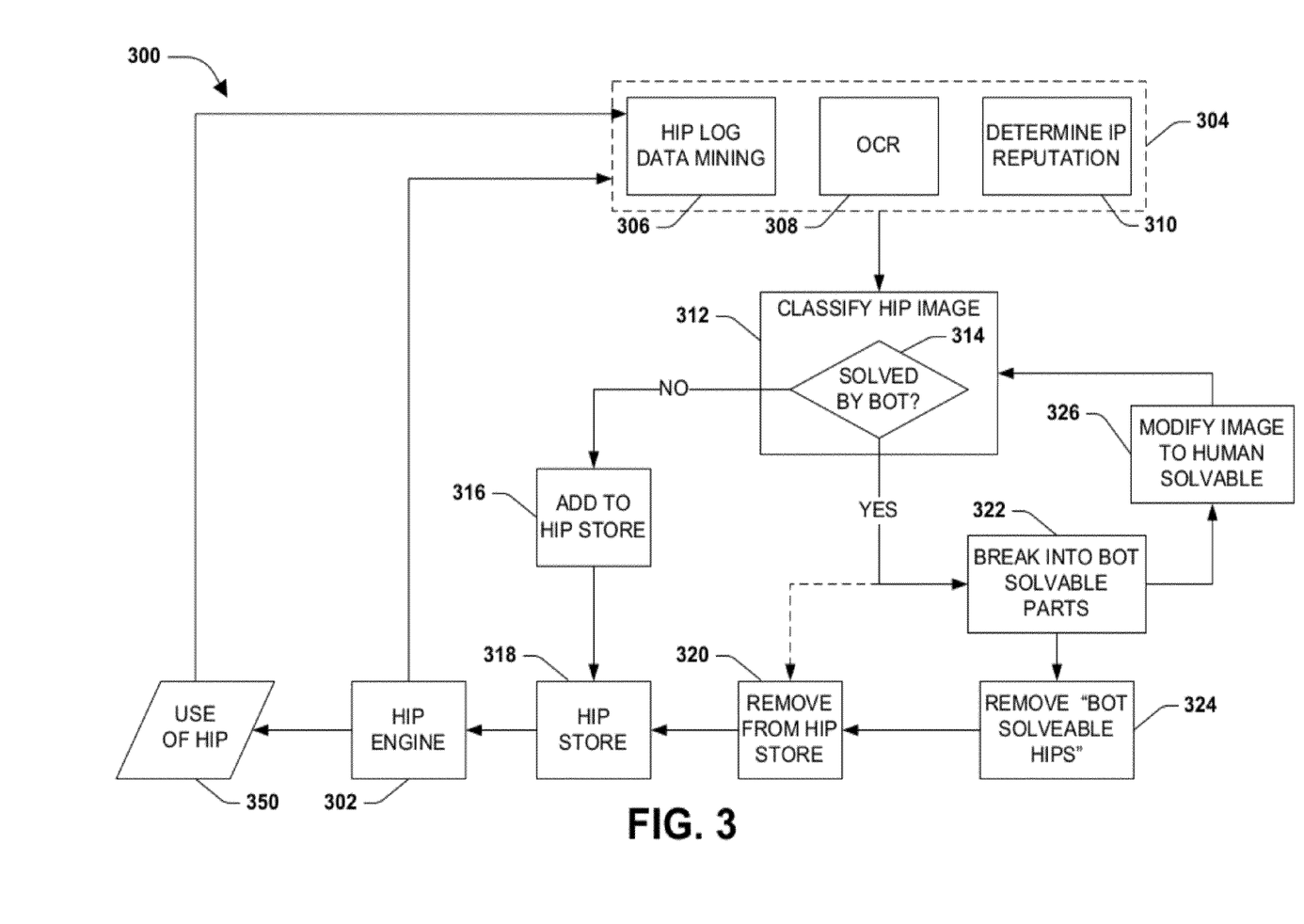
FIG. 3 is a flow diagram illustrating one embodiment where one or more techniques described herein may be implemented.

FIG. 3 is a flow diagram illustrating one embodiment 300 where one or more techniques described herein may be implemented. A HIP engine 302 can generate HIPs to be used 350, such as by an online user registration process (e.g., or some other online procedures that wishes to authenticate that a human is interacting with the procedure instead of a "bot"). For example, when a new user is registering with a website for a first time, the registration process typically uses a HIP to help ensure that the user registering is a human and not an automated bot (e.g., utilizing an OCR algorithm to automatically solve the HIP). In this embodiment, the HIP engine utilizes a HIP store 318, which can comprise stored HIPs for use by the HIP engine.

In one embodiment, in order to mitigate machine solvable HIPs used by the HIP engine 302, the HIPs from the HIP store 318 are classified, at 304. A HIP that has not been used by the HIP engine 302 (e.g., for an online registration), such as one that has been recently added to the HIP store 318 (e.g., newly generated), may be subjected to optical character recognition (OCR), at 308. In one embodiment, the OCR for the HIP may comprise running the HIP through one or more OCR engines (e.g., that use OCR algorithms and/or libraries). For example, one or more existing OCR technologies may be applied to the HIP to determine OCR solvability (e.g., a score) for the HIP. Further, for example, as newer OCR technologies are identified, they may also be used to determine the OCR solvability, at 308.

At 312, the OCR solvability can be used to classify the HIP, which can comprise an image. As described above, a trained classifier can be used to classify the HIP, for example, using one or more variables. In one embodiment, the variable input to the trained classifier for the HIP can comprise the OCR solvability determined by the OCR run on the HIP at 308, for example, at least for a HIP that has not been previously classified, and/or used by the HIP engine 302.

In one embodiment, the HIP may be classified as: machine solvable, human solvable, both human and machine solvable, or neither human nor machine solvable. In one embodiment, not all of the classifications may be used. For example, the classifier may merely classify the HIP as either machine solvable, human solvable, or both human and machine solvable. As another example, merely machine solvable and human solvable may be used as potential classifications.

In one embodiment, if a HIP is classified as machine solvable, the HIP may be entirely solvable by a machine. For example, if the respective characters in the HIP (e.g., including any spaces if there are multiple "words") can be identified by the OCR algorithm, the HIP may be classified as machine solvable. In one embodiment, if the HIP is classified as human solvable, it can merely be solved by a human. For example, the OCR may identify that none of the characters in the HIP can be identified appropriately, thereby classifying the HIP as merely human solvable.

It will be appreciated that, even though the HIP may be classified as human solvable (e.g., meaning that it was not able to be solved by the OCR), a human may also not be able to solve the HIP (e.g., the characters are undecipherable in the image). In one embodiment, a HIP that is classified as human solvable can be further analyzed by a human (e.g., or a human analog) to determine if it can actually be solved by a human.

In one embodiment, if a HIP is classified as both human and machine solvable (or simply as machine solvable), at least a portion of the HIP may be solvable by a machine, for example, where at least one of the characters in an image of the HIP can be recognized by the OCR. In one embodiment, the classifier may be able to determine that the HIP is neither human nor machine solvable, such as where the characters in the image of the HIP are undecipherable.

In one embodiment, the classification may identify a classification confidence score for the HIP. For example, a classification confidence score may be identified for the respective classifications used by the classifier (e.g., machine solvable, human solvable, both human and machine solvable, and/or neither human nor machine solvable). As another example, when merely utilizing the OCR solvability as a classifier input, a confidence score can be identified for machine solvable, human solvable, and both human and machine solvable classifications. In this example, a confidence score may comprise an indication of "confidence" that the classification applies to the HIP, such as a probability.

In one embodiment, classifying the HIP can comprise classifying the HIP using a desired threshold for a classification confidence score for respective classifications. For example, a threshold value may be used to identify which of the classifications can be applied to the HIP. In one embodiment, the threshold may be adjusted based on training of the classifier, empirical evidence of classified HIPs, and/or a desired outcome for HIP classifications. As an example, a threshold may comprise a highest confidence score, such as selecting the classification having a highest confidence score. As another example, the threshold may comprise a desired value that the confidence score needs to meet (or surpass) for the HIP to be assigned to the classification associated with the score.

At 314 in the example embodiment 300, if the HIP is classified as not solved by a bot (e.g., merely human solvable) the HIP can be added to the HIP store 318, at 316. If the HIP is classified as solvable by a bot, at 314, the HIP may, at 320, be removed from use by the HIP generation system, for example, particularly if the HIP is classified as machine solvable (e.g., the entire HIP can be solved by the OCR 308). If the HIP is classified as machine (bot) solvable, at 314, the HIP can also be broken down into bot solvable parts, at 322.

In one embodiment, the HIP may comprise a both human and machine solvable HIP, such as when classified as machine and human solvable. In this embodiment, one or more machine solvable parts of the HIP can be identified. For example, the OCR 308 may identify characters and/or groups of characters in the image of the HIP that can be solved by a bot. At 326, the identified one or more machine solvable parts can be modified into a (potentially) human solvable part to generate a modified HIP. For example, as described above, HIPs can comprise an image of distorted characters, such as where inclusions are added, characters are rotated, twisted, and/or have their alignment changed.

In one embodiment, the modification may comprise applying distortions to the bot solvable portions, for example, such that a machine may not solve the HIP. In another embodiment, characters and/or words may be added to or removed from the HIP, and/or characters may be substituted. The modified HIP can be sent back to be classified, at 312, for example, to determine if it is merely human solvable. If the modified HIP is human solvable, at 314, it can be added to the HIP store 318, at 316.

At 324, those portions of HIPs and/or entire HIPs that are machine solvable can be removed from use by the HIP engine 302. For example, the classification may identify portions of HIPs that may not be sufficiently modified such that they are not machine solvable. In this example, these portions of "bot" solvable HIPs, which cannot be modified, may be removed from use.

In one embodiment, HIPs that are stored in the HIP store 318 and that are being used by the HIP engine 302 (e.g., for user registration, authentication, etc.) can be periodically and/or routinely checked for machine solvability, for example. For example, when HIPs 350 provided by the HIP engine 302 are used (e.g. on a website), a HIP log can be mined for data, at 306, associated with the use of the HIP. For example, when a HIP is provided for use, a log of information associated with the HIP's use can be maintained.

In one embodiment, such data mined from the HIP log can comprise: mistakes that are made when using a HIP (e.g., entering the HIP in a dialog box); a time duration for entering the HIP, and/or a time duration for entering respective characters in the HIP (e.g., how long it takes to enter the characters comprised in the HIP image); and/or characteristics of how the respective characters are entered for the HIP (e.g., in order, deleting and replacing, etc). For example, as described above, these data can comprise characteristics that may facilitate in classification of the HIP as human and/or machine solvable.

In one embodiment, HIP solving pattern data can be collected from a HIP use log. For example, the HIP solving pattern collected data can be used as input for variables to the trained classifier, when classifying the HIP image, at 312. As another example, the HIP solving pattern collected data can be provided for the HIP classification along with the OCR solvability data to classify a HIP that has previously been used by the HIP generation engine 302 (e.g., and therefore has a HIP log to mine data from).

In one embodiment, characteristics that are used for training the classifier, and/or input for a HIP classification, can comprise an Internet-based address reputation for a location of where the HIP was solved, at 310. In one embodiment, the Internet-based address for the HIP can be collected from the HIP use log, such as from the HIP log data mining (e.g., 306). For example, an IP address for where the HIP was solved can be identified from the log. In one embodiment, the identified IP address can be compared against a database of known IP addresses to determine whether it comprises a known "bad actor" location.

For example, some geographic locations, Internet Service Providers (ISPs), servers, and/or IP addresses may be documented to comprise malicious users that utilize bots to solve HIPs. In this embodiment, for example, these IP addresses can be used as input to train the classifier, and/or as input for classification of the HIP, to determine whether the HIP is machine solvable. For example, if the HIP was solved at an IP address that is known to use bots to solve HIPs, this may help determine that the HIP is machine solvable (e.g., as it was solved at a known bot IP address).

At 312, as described above, the previously used HIPs are classified. If they are classified as merely human solvable, at 314, they can be added back into the HIP store 318, at 316. However, if they are classified as machine solvable or both human and machine solvable, at 314, they can be either removed from the HIP store, at 320, or broken into their respective bot solvable parts, at 322. Further, as described above, the bot solvable parts can either be removed from use by the HIP engine, at 324, or modified to (potentially) be merely human solvable, at 326. The modified HIPs can then be reclassified at 312.

In one embodiment, using the example embodiment 300, the HIP engine can be improved to provide merely human solvable HIPs. For example, newly created HIPs that have not been used can be checked to determine whether they are merely human solvable. Further, data can be mined from HIP use logs to help train the classifier and/or classify HIPs. The previously used HIPs can be checked to determine whether they are merely human solvable utilizing the mined data.

Further, as OCR technology and other HIP solving technology improves, for example, the improved technology can be used to help remove the machine solvable HIPs from use by the HIP engine.

A system may be devised that can mitigate machine solvable human interactive proofs (HIPs) from use by a HIP generation system. A HIP generation system can be used by a website, such as during user registration/authentication, to determine that a human is interacting with the website (e.g., and not an automated bot). Automated bots can use optical character recognition (OCR) technology to solve some HIPs, while other HIPs may not be able to be solved by OCR, for example. Those HIPs that can be solved by automated systems can be removed from use by the HIP generation system, or they may be changed such that an automated detection system may not recognize the HIP, for example.

Figure 4:
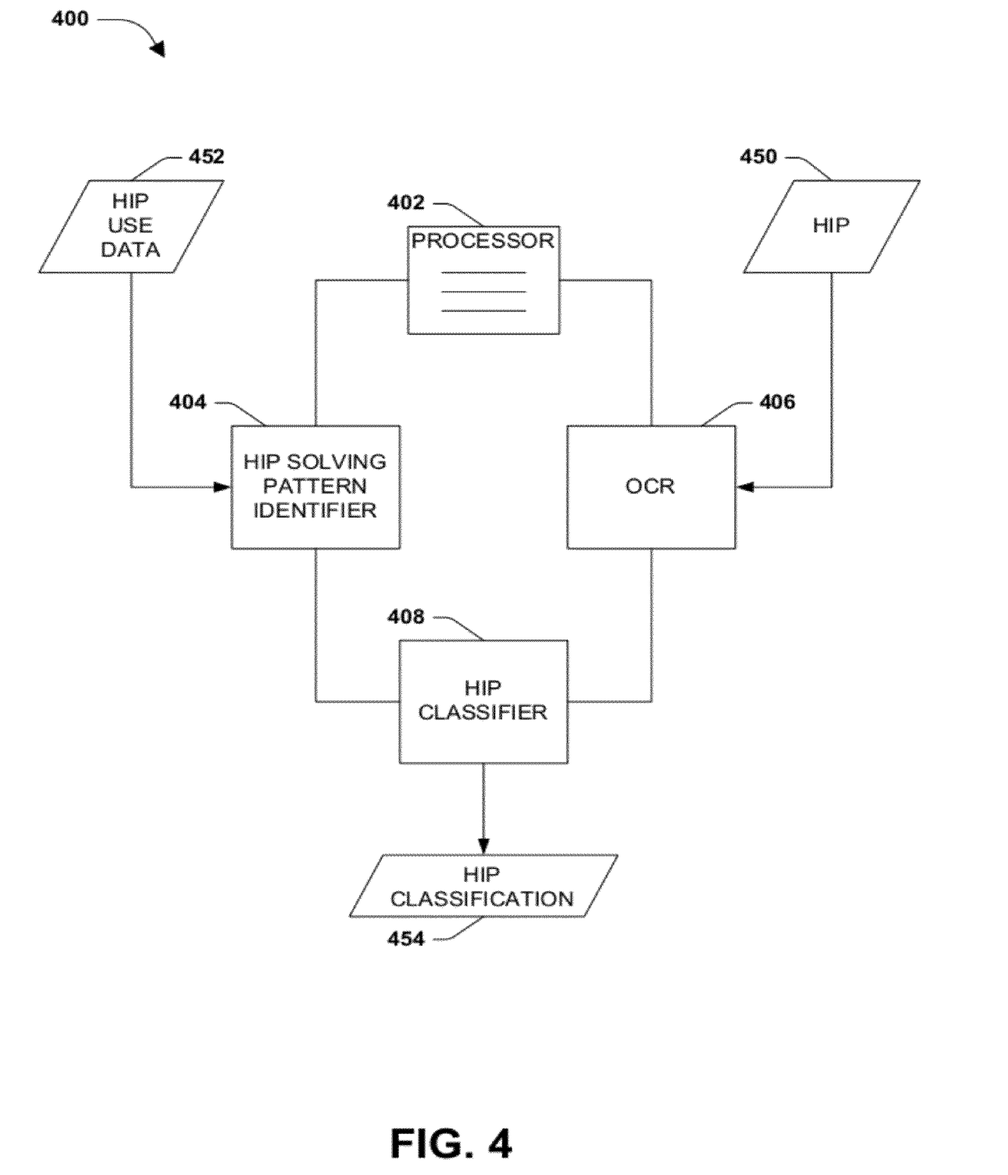
FIG. 4 is a component diagram of an exemplary system for mitigating machine solvable HIPs.

FIG. 4 is a component diagram of an exemplary system 400 for mitigating machine solvable HIPs. A computer-based processor 402 is configured to process data for the system, and is operably coupled with an optical character recognition (OCR) component 406. The OCR component 406 determines OCR solvability for a HIP 450. For example, the OCR component can determine if the HIP 450 is solvable using OCR technology, which may comprise one or more OCR systems, engines, and/or algorithms. Further, the OCR component 406 may determine OCR solvability by identifying a probability that the HIP 450 is solvable by OCR, such as by assigning an OCR solvability score to the HIP, based a combination of solvability by the one or more OCR systems, for example.

A HIP solving pattern component 404 is operably coupled with the processor 402. The HIP solving pattern component 404 identifies one or more HIP solving patterns for the HIP 450. For example, a HIP solving pattern can be identified from HIP use data 452 that may be collected from a HIP log. In one embodiment, the HIP log comprises information about how the HIP was used, solved, applied, etc., such as mistakes made when entering the HIP in the website, time duration to enter the characters and/or the entire HIP, and/or how the HIP was entered. As an example, this data can help distinguish between a machine solved HIP and a human solved HIP, as machines and humans typically solve and/or attempt to solve HIPs differently (e.g., machines typically solve HIPs faster than humans).

A HIP classification component 408 is operably coupled with the OCR component 406 and the HIP solving pattern component 404. The HIP classification component 408 determines a HIP classification 454 for the HIP 450 using the OCR solvability, provided by the OCR component 406, and one or more HIP solving patterns, provided by the HIP solving pattern component 404, for the HIP 450. The HIP classification can comprise an indication of a machine solvable HIP, and/or a human solvable HIP. For example, the HIP classification component 408 can receive a solving pattern for a HIP (e.g., time of entry, mistakes made, how entered) and an OCR solvability probability as input, and identify a classification for the HIP (e.g., human solvable and/or machine solvable) as an output.

Figure 5:
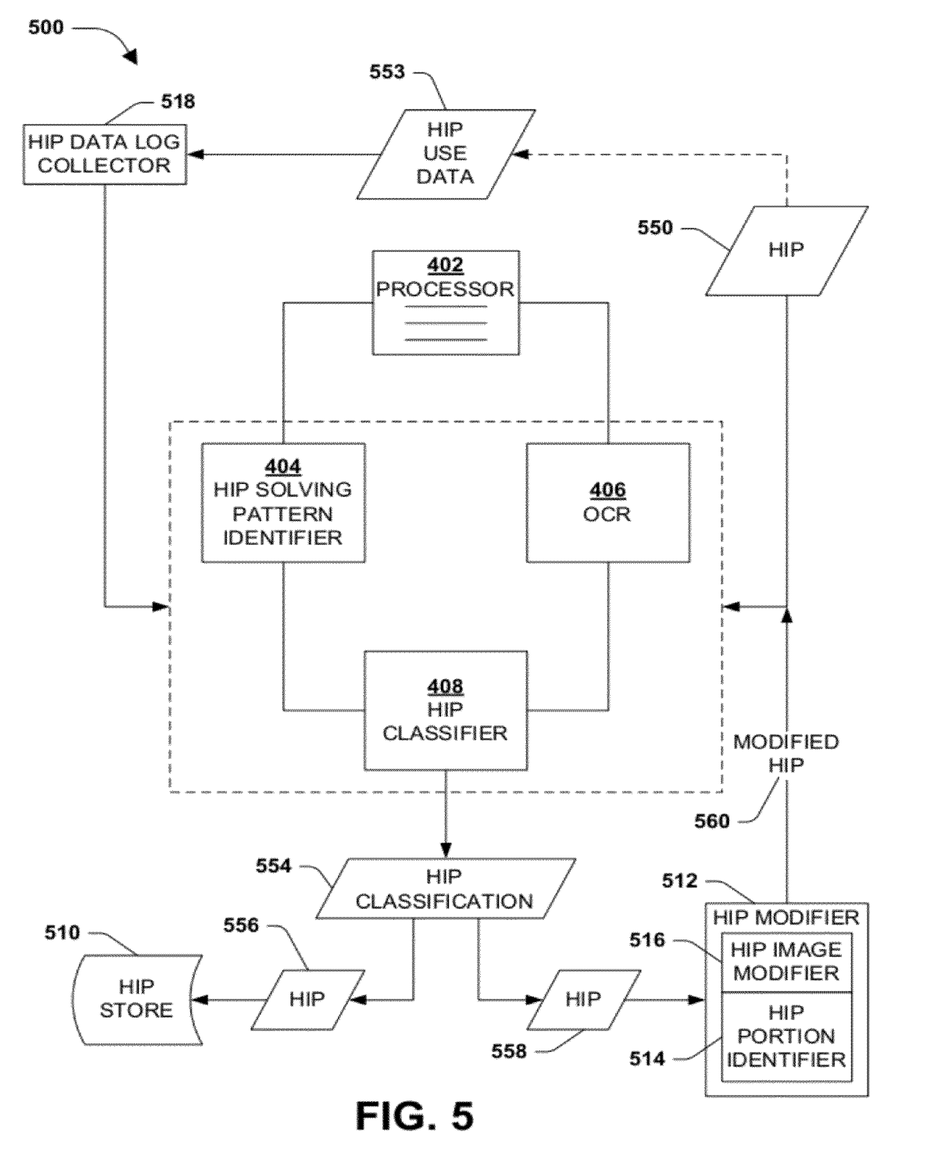
FIG. 5 is a component diagram illustrating one embodiment where one or more systems described herein may be implemented.

FIG. 5 is a component diagram illustrating one embodiment 500 where one or more systems described herein may be implemented. In this example, an extension of FIG. 4 is provided and thus description of elements, components, etc. described with respect to FIG. 4 may not be repeated for simplicity. A HIP store component 510 can utilize merely HIPs 556 that are classified as human solvable. For example, if the HIP classification component 408 identifies the classification 554 of the HIP 550 as merely human solvable (e.g., no portions are machine solvable), the HIP 556 can be added (or kept in) the HIP store 510, such as for use by a HIP generation system.

A HIP modification component 512 can modify a HIP, which is at least partially machine solvable, into a merely human solvable HIP. For example, if the HIP classification 554 for the HIP 550 comprises both human and machine solvable, the classified HIP 558 can be modified. The HIP modification component 512 may comprise a HIP portion identification component 514 that can identify one or more portions of the at least partially machine solvable HIP that are machine solvable. Further, the HIP modification component 512 may comprise a HIP image modifier component 516 that can alter the at least partially machine solvable portion of the HIP to a (potentially) merely human solvable portion of the HIP.

As an example, the HIP modification component 512 identifies one or more portions of the HIP 558 that are machine solvable (e.g., one or more characters in the image of the HIP). In this example, those portions of the HIP 558 that are identified to be machine solvable can be altered by the HIP image modifier component 516 to be merely human solvable (e.g., or may be rejected if not able to be appropriately altered). Further, for example, the resulting HIP can comprise a modified HIP 560, which may be reclassified to determine if it is merely human solvable (e.g., and therefore added to the HIP store).

A HIP log data collection component 518 can identify HIP use data 553, associated with the HIP 550, from a HIP log. HIP use data 553 can comprise mistakes that are made when the HIP 550 is entered, such as into a website dialog box (e.g., if the HIP was not entered correctly, and/or what parts were mistaken). The HIP use data 553 can further comprise time duration for entering the HIP, and/or time duration for entering respective characters in the HIP, such as how long it takes for each character of the HIP to be entered, and/or for the entire HIP to be entered. The HIP use data 553 can additionally comprise characteristics of how the respective characters are entered for the HIP, such as if they are entered in order, back-tracking, deleting and re-entering, etc. The HIP use data 553 can also comprise an Internet-based address reputation for a location of where the HIP was solved, such as whether the IP address of the solving location is associated with a known HIP solving bot.

Figure 6:
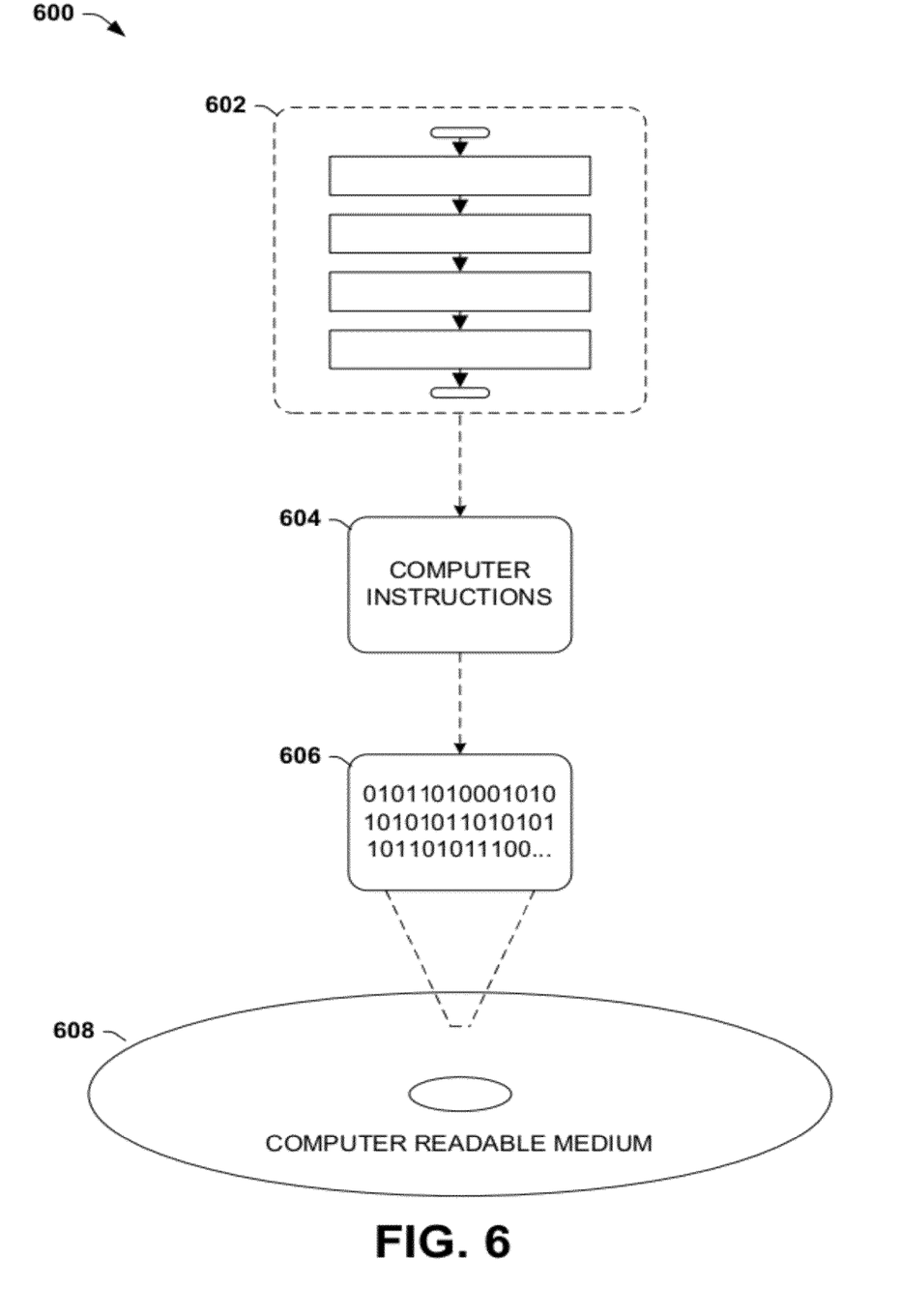
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of the exemplary method 200 of FIG. 2, for example. In another such embodiment, the processor-executable instructions 604 may be configured to implement a system, such as at least some of the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
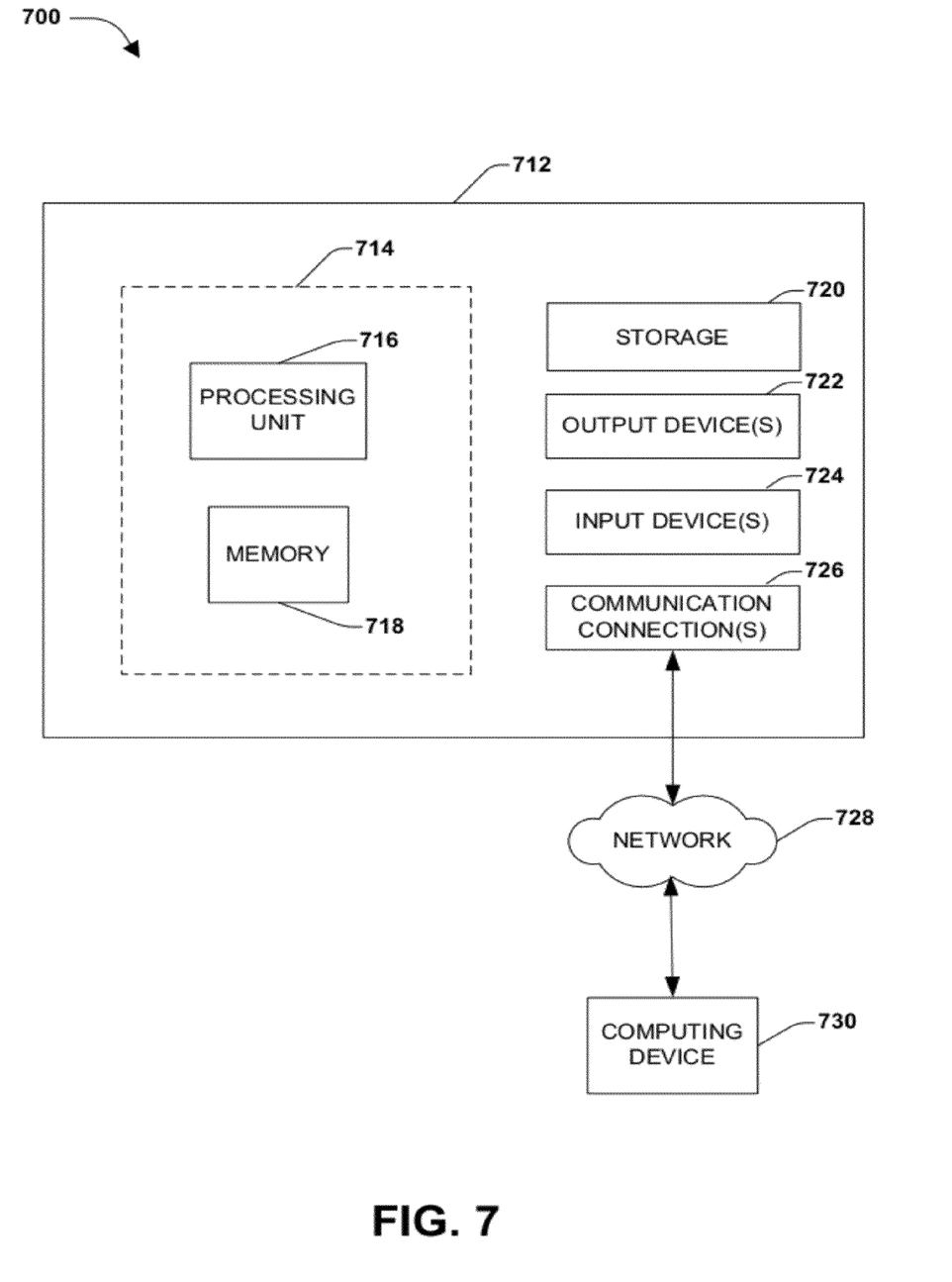
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method for mitigating machine solvable human interactive proofs (HIPs), comprising:
   determining a HIP classification for a HIP using a trained classifier where the classifier is trained over a set of one or more training HIPs having known characteristics for:
   HIP optical character recognition (OCR) solvability; and a HIP solving pattern based upon a characteristic of how one or more characters are entered for a training HIP, the characteristic corresponding to at least one of back-tracking, deleting and replacing or deleting and re-entering; and identifying the HIP for use in a HIP generation system if the HIP classification comprises a merely human solvable classification.

2. The method of claim 1, comprising subjecting the HIP to OCR using one or more OCR engines to determine OCR solvability for the HIP.

3. The method of claim 1, comprising collecting HIP solving pattern data from a HIP use log.

4. The method of claim 3, collecting HIP solving pattern data comprising collecting data indicating two or more of:
one or more mistakes made when using the training HIP;
a time duration for entering at least one character of the training HIP; or
the characteristic of how one or more characters are entered.

5. The method of claim 1, comprising training the classifier over a set of one or more training HIPs using characteristics of HIPs solved by humans.

6. The method of claim 1, comprising training the classifier over a set of one or more training HIPs using characteristics of HIPs solved by machines.

7. The method of claim 1, comprising training the classifier over a set of one or more training HIPs using characteristics of HIPs solved by humans and machines.

8. The method of claim 1, comprising classifying the HIP as one of the following classifications:
merely machine solvable;
merely human solvable;
both human and machine solvable; or
neither human nor machine solvable.

9. The method of claim 1, comprising classifying the HIP using a desired threshold for a classification confidence score for respective classifications.

10. The method of claim 1, comprising removing the HIP for use in the HIP generation system if the HIP comprises a merely machine solvable HIP.

11. The method of claim 1, comprising, if the HIP comprises a both human and machine solvable HIP:
identifying one or more machine solvable parts of the HIP; and
modifying the identified one or more machine solvable parts into a human solvable part to generate a modified HIP.

12. The method of claim 1, comprising:
determining a HIP classification for a modified HIP using the trained classifier, where the modified HIP comprises a both human and machine solvable HIP that is modified to be a merely human solvable HIP; and
using the modified HIP in the HIP generation system.

13. The method of claim 1, comprising:
running one or more HIPs in an existing HIP store through the trained classifier.

14. A system for mitigating machine solvable human interactive proofs (HIPs), comprising:
one or more processing units; and
memory comprising instructions that when executed by at least one of the one or more processing units, perform a method comprising:
determining a HIP classification for a HIP using a trained classifier where the classifier is trained over a set of one or more training HIPs having known characteristics for:
HIP optical character recognition (OCR) solvability; and
a HIP solving pattern based upon a characteristic of how one or more characters are entered for a training HIP, the characteristic corresponding to at least one of back-tracking, deleting and replacing or deleting and re-entering; and
identifying the HIP for use in a HIP generation system if the HIP classification comprises a merely human solvable classification.

15. The system of claim 14, the method comprising not identifying the HIP for use in the HIP generation system if the HIP classification comprises a machine solvable classification.

16. The system of claim 14, the method comprising modifying the HIP, if the HIP classification comprises a machine solvable classification.

17. The system of claim 14, the method comprising identifying one or more portions of the HIP that are machine solvable.

18. The system of claim 17, the method comprising altering at least some of the one or more portions of the HIP that are machine solvable to be merely human solvable.

19. The system of claim 14, the HIP solving pattern based upon an Internet-based address reputation for a location where one or more HIPs were solved.

20. A tangible computer readable storage device comprising instructions that when executed perform a method for mitigating machine solvable human interactive proofs (HIPs), comprising:
determining a HIP classification for a HIP using a trained classifier where the classifier is trained over a set of one or more training HIPs having known characteristics for:
HIP optical character recognition (OCR) solvability; and
a HIP solving pattern based upon a characteristic of how one or more characters are entered for a training HIP, the characteristic corresponding to at least one of back-tracking, deleting and replacing or deleting and re-entering; and
identifying the HIP for use in a HIP generation system if the HIP classification comprises a merely human solvable classification.

* * * * *